United States Patent
Watanabe

(10) Patent No.: US 6,979,243 B2
(45) Date of Patent: Dec. 27, 2005

(54) MANUFACTURING METHOD AND DISMANTLING METHOD FOR PLASMA DISPLAY DEVICE

(75) Inventor: Hiroshi Watanabe, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 233 days.

(21) Appl. No.: 10/421,846

(22) Filed: Apr. 24, 2003

(65) Prior Publication Data

US 2003/0230381 A1 Dec. 18, 2003

(30) Foreign Application Priority Data

Apr. 26, 2002 (JP) ........................................ 2002-126814

(51) Int. Cl.[7] .................................................. H01J 9/24
(52) U.S. Cl. ............................ 445/24; 445/23; 313/495
(58) Field of Search ............................... 445/23, 24, 25; 313/495, 45–47; 156/230

(56) References Cited

U.S. PATENT DOCUMENTS 5,831,374 A * 11/1998 Morita et al. ................. 313/46

FOREIGN PATENT DOCUMENTS

JP 2807672 7/1998

* cited by examiner

Primary Examiner—Karabi Guharay
Assistant Examiner—Sharlene Leurig
(74) Attorney, Agent, or Firm—Wenderoth, Lind & Ponack, L.L.P.

(57) ABSTRACT

A manufacturing method and dismantling method of a plasma display device are disclosed. These methods can bond a panel to a holder reliably, and can separate the panel and holder easily upon scrapping a plasma display device. The manufacturing method comprises steps of: (a) bonding one of adhesive layers, which are provided on both surfaces of an adhesive sheet consisting of a porous insulating sheet, to a panel holder, to bond a rear surface of a panel to the holder, and (b) bonding another adhesive layer to a rear surface of the panel. And, the dismantling method comprises the step of separating the panel from the holder by cutting the porous insulating sheet of the adhesive sheet.

20 Claims, 8 Drawing Sheets

FIG. 1
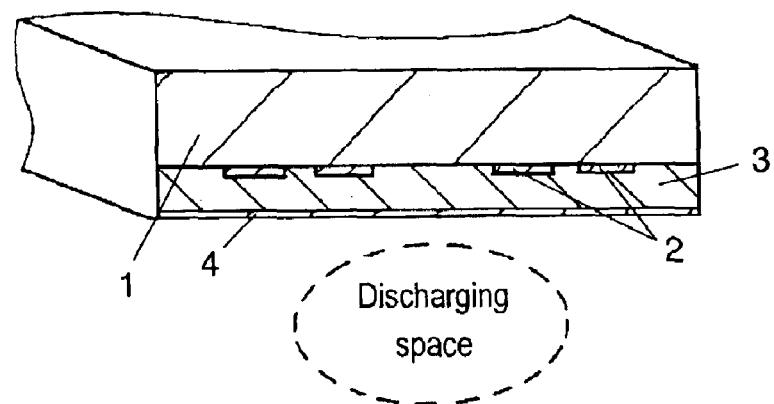
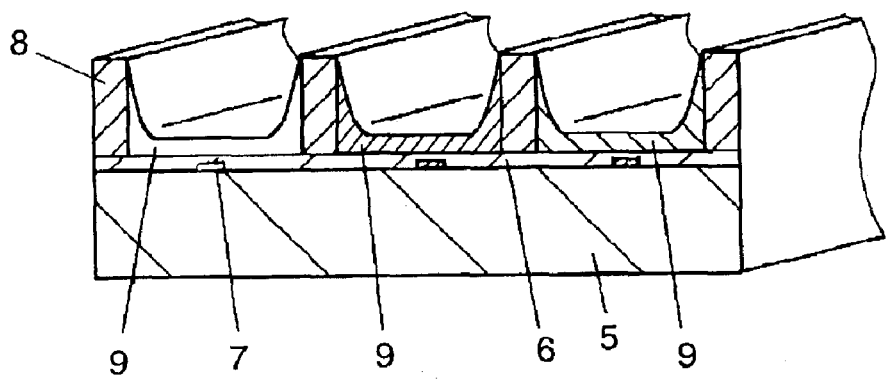
FIG. 2
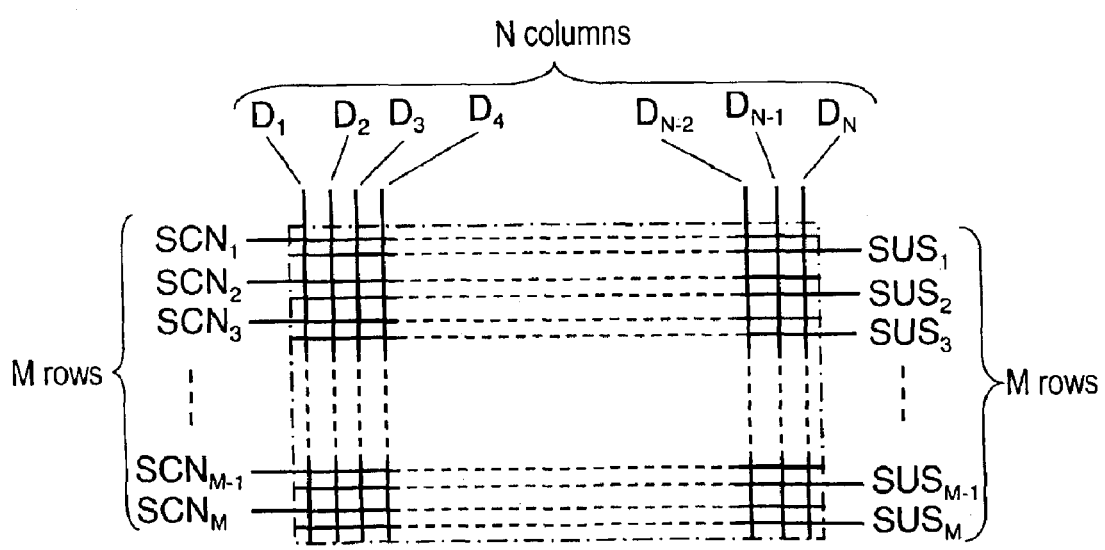

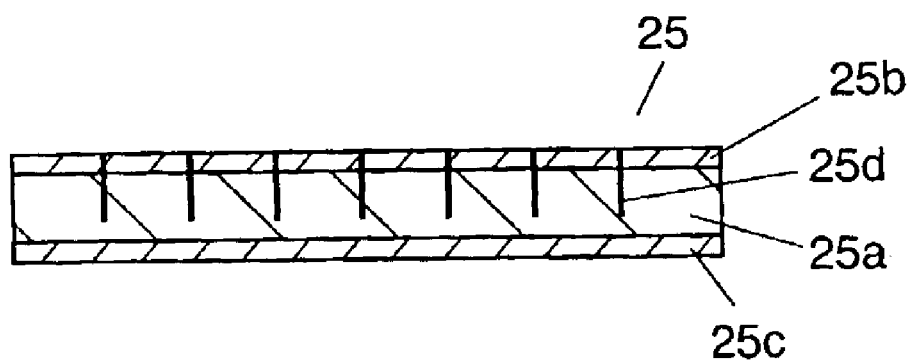
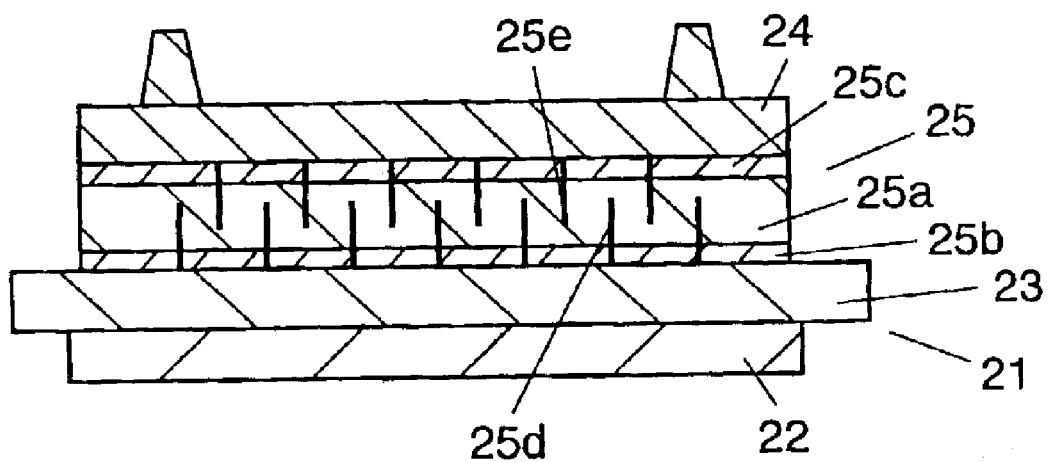

MANUFACTURING METHOD AND DISMANTLING METHOD FOR PLASMA DISPLAY DEVICE

TECHNICAL FIELD

The present invention relates to a manufacturing method for a plasma display device, and a dismantling method for scrapping the plasma display device, known as a technology for a large screen with slim and lightweight display.

BACKGROUND ART

Recently, a plasma display device (thin display panel) has become an attractive subject as a display with excellent visibility, and this technology is steadily advancing for large-sized screens with high definition.

Such plasma display devices are roughly divided into AC powered and DC powered in terms of a driving method, and surface discharge and counter discharge in terms of a discharging method. Currently, however, surface discharge AC powered structure has become a mainstream technology from a stand point of high definition, large screen and simplified manufacturing.

In the field of plasma display device technology, an example is disclosed in Japanese Patent No. 2,807,672 to bond together a panel, made mainly of glass, and a holder, made of aluminum and the like, via double face adhesive composed of acrylic, urethane or silicone material, or to secure the panel and the holder via a heat conductive sheet.

A panel and chassis of a plasma display device must be bonded tightly, as the panel of the plasma display device must never peel off from the chassis during use or transportation, and heat generated in the panel needs to be conducted toward the chassis efficiently. On the other hand, a glass panel of a plasma display device must necessarily be easily separated from a metal chassis for scrapping and recycling of resources in case of device failure due to some accident.

However, a panel and a chassis are bonded tightly to prevent possible peeling off, and to conduct heat generated in the panel through a conductive sheet efficiently. Due to the above conventional art, a panel is firstly broken into pieces and then glass pieces left on a chassis must be cleared by a scraper or the like to separate the panel from the chassis. This dismantling work, therefore, takes a lot of time and exhibits much trouble.

The present invention aims at providing a method capable of easily separating a panel from a chassis, serving as a panel holder, to solve problems associated with the conventional art.

SUMMARY OF THE INVENTION

The manufacturing method of a plasma display panel of this invention aims to bond a panel to a holder to hold the panel, with the panel comprising a pair of substrates, in which at least a front side of the substrates is transparent, facing each other so that a discharge space is formed between the substrates to provide a plurality of discharge cells.

The method comprises the steps of:

(a) bonding a holder to a first adhesive layer of adhesive layers provided on both surfaces of a heat conductive porous insulating sheet of an adhesive sheet; and (b) bonding a rear side of the panel to a second adhesive layer of the adhesive sheet.

This configuration can bond the adhesive sheet to cover a full surface of the panel or holder evenly, and can conduct heat from the panel toward the holder efficiently.

The dismantling method of a plasma display device of this invention aims to separate a panel from a holder, with the panel comprising a pair of substrates, in which at least a front side of the substrates is transparent, facing each other so that a discharge space is formed between the substrates to provide a plurality of discharge cells.

A rear surface of the panel and the holder, to hold the panel, are bonded to adhesive layers provided on both surfaces of a heat conductive porous insulating sheet of an adhesive sheet, respectively.

The method comprises a step of cutting the porous insulating sheet of the adhesive sheet to separate the panel from the holder.

This configuration can easily separate a panel, made mainly of glass, from a chassis, made mainly of metal, by cutting the porous insulating sheet for selecting and recycling of resources in case of scrapping due to device failure or the like.

BRIEF DESCRIPTION OF THE DRAWINGS

FIG. 1 illustrates a perspective view showing a panel structure of a plasma display device.

FIG. 2 illustrates a wiring diagram showing a panel electrodes arrangement of a plasma display device.

FIG. 4 illustrates a cross-sectional view showing a structure of an adhesive sheet used in an exemplary embodiment of the present invention.

FIG. 6 illustrates a schematic cross-sectional view showing a configuration of a plasma display device used in another exemplary embodiment of the present invention.

DETAILED DESCRIPTIONS OF THE PREFERRED EMBODIMENTS

Exemplary embodiments of this invention are described with reference to the drawings.

Figure 3:
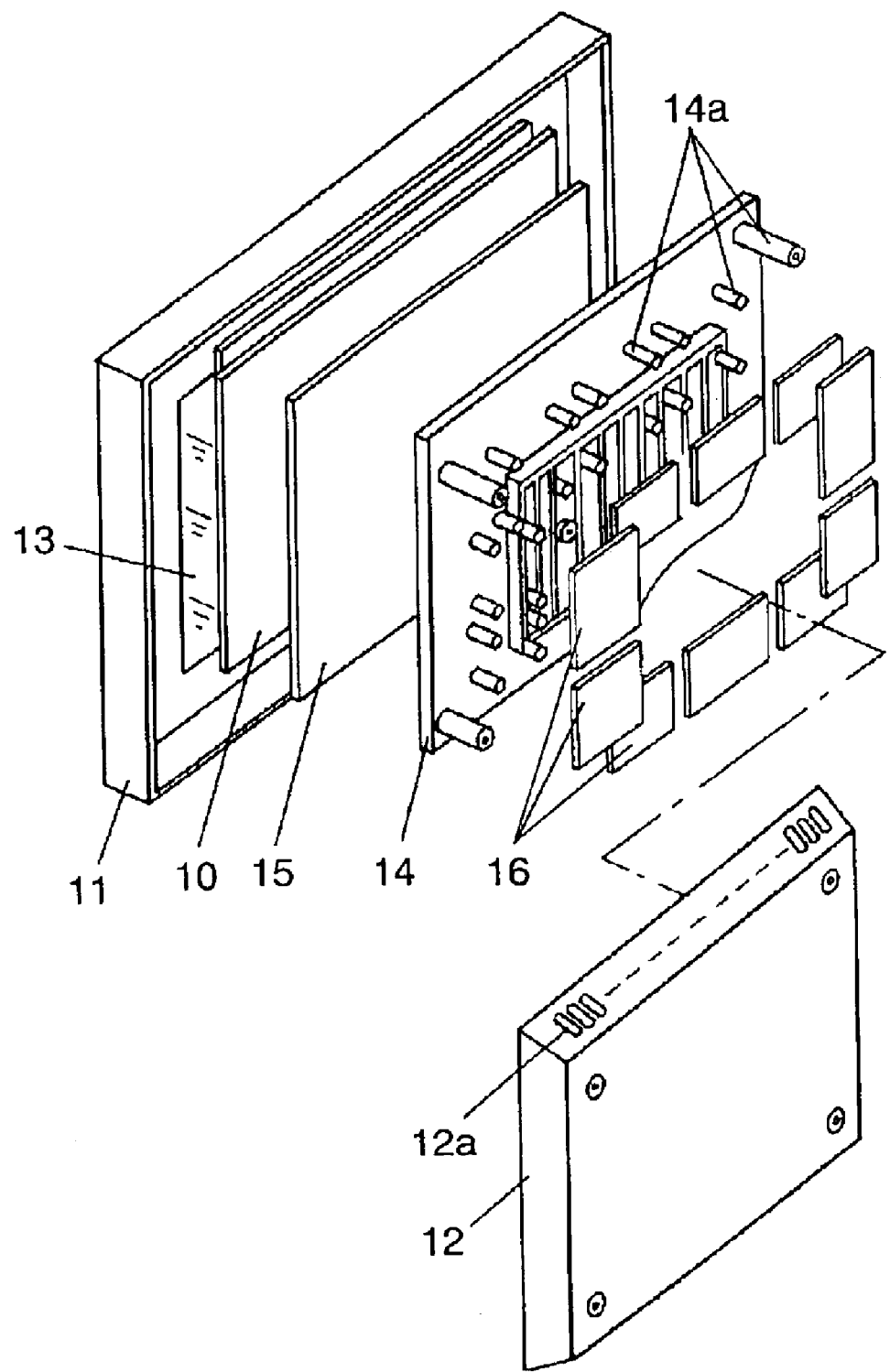
FIG. 3 illustrates an exploded perspective view showing an example of a general structure of a plasma display device.

First, a plasma display device is described using FIGS. 1 to 3.

FIG. 1 illustrates a perspective view showing a panel structure of a plasma display device.

A panel has following structures:

(a) a plurality of arrays of display electrodes 2 consists of pairs of a scan electrode and a sustain electrode formed on transparent front substrate 1;

(b) dielectric layer 3 formed on the arrays of electrodes to cover the electrodes;

(c) protective layer 4 formed on dielectric layer 3 to cover the dielectric layer;

(d) a plurality of arrays of stripe shaped address electrodes 7 covered by overcoat layer 6 formed on rear substrate 5, which is placed facing front substrate 1, with the address electrodes crossing display electrodes 2 consisting of scan electrodes and sustain electrodes;

(e) a plurality of ribs 8 placed in parallel with address electrodes 7;

(f) fluorescent layers 9 provided on side walls of ribs 8 and on surfaces of overcoat layer 6;

(g) substrate 1 and substrate 5 placed facing each other so that display electrodes 2 consisting of scan electrodes and sustain electrodes cross address electrodes 7 at approximately right angles, with tiny discharge spaces being formed between the substrates, which are sealed along peripheries of the substrates;

(h) a discharge space filled with one of rare gases such as Herium, Neon, Argon or Xenon, or a mixture of these gases, as a discharge gas;

(i) a discharge space divided by ribs 8, thereby creating a plurality of discharge cells where intersection points of display electrodes 2 and address electrodes 7 are located; and (j) each discharge cell provided with one of fluorescent layer 9 of red, green and blue in this order.

FIG. 2 illustrates a wiring diagram showing a panel electrode arrangement of a plasma display device. Pairs of scan electrodes and sustain electrodes, and address electrodes form an M×N matrix configuration that has scan electrode codes of SCN 1 to SCN M and sustain electrode codes of SUS 1 to SUS M arranged in a row direction and address electrode codes of D 1 to D N arranged in a column direction, as shown in FIG. 2.

In a plasma display panel having the above electrode configuration, a writing pulse supplied between an address electrode and a scan electrode generates address discharge between the address electrode and scan electrode.

By selecting suitable discharge cells, a sustaining discharge between scan electrodes and sustain electrodes is produced to provide a prescribed display by applying an alternative periodically flipping sustaining pulse on scan electrodes and sustain electrodes.

FIG. 3 illustrates an exploded perspective view showing an example of a general structure of a plasma display device. In FIG. 3, a chassis to house panel 10 consists of front frame 11 and back cover 12 made of metal.

Optical filter and front cover 13 made of glass or the like, serving as a protector of the panel as well, is disposed at an opening of front frame 11. In addition, front cover 13 is provided with, for example, a silver deposition to shield radiation of unnecessary electromagnetic waves. And, a plurality of vents 12a are provided in back cover 12 to radiate heat generated in panel 10 to an exterior of the chassis.

Panel 10 is bonded to a front surface of chassis 14 made of aluminum or the like, serving as a panel holder and a heat radiator as well, via a double face adhesive 15 composed of acrylic, urethane or silicone material, or via an adhesive sheet 15 containing heat conductive material. A plurality of circuit blocks 16 to drive panel 10, for displaying, is mounted on back surface of chassis 14. Adhesive sheet 15 serves to conduct heat generated in panel 10 to chassis 14 for efficient radiation. Each circuit block 16 has electrical circuits to drive and control panel 10 for displaying, with external terminals provided on peripheries of panel 10 being electrically connected to a plurality of flexible wiring plates (not shown) protruding on all sides of chassis 14.

A back surface of chassis 14 has bosses 14a, formed by die casting, for setting the circuit blocks 16 or fixing back cover 12. This chassis 14 can replace an aluminum plate with fixed pins.

Next, a manufacturing method of a plasma display device used in an exemplary embodiment of the present invention is described. FIG. 4 illustrates a cross-sectional view showing a structure of an adhesive sheet used in the exemplary embodiment of the present invention. Adhesive sheet 25 is porous insulating sheet 25a composed of a foam such as urethane foam and the like, onto which adhesive layers 25b and 25c are applied on both surfaces, as shown in FIG. 4.

Adhesive layer 25b, to be bonded to a panel has a plurality of slits 25d extending from a surface of adhesive layer 25b in a thickness direction of porous insulating sheet 25a. Slits 25d have an approximate depth to reach intermediate of insulating sheet 25a, and can be provided by a perforated line with a certain pattern.

Porous insulating sheet 25a is made of a highly he at conductive material to increase a total heat conductive property of adhesive sheet 25.

FIGS. 5A–5D illustrate a partial schematic view showing a manufacturing process of a plasma display device used in an exemplary embodiment of the present invention. In FIGS. 5A–5D, panel 21 has a structure having front substrate 22 and rear substrate 23.

A plurality of arrays of display electrodes are formed on transparent front substrate 22 made of a glass plate or the like, and a dielectric layer and a protective layer are applied to cover these groups of electrodes.

A plurality of arrays of address electrodes covered by an overcoat layer are formed on rear substrate 23, facing front substrate 22, and cross the display electrodes, and a plurality of ribs (8 in FIG. 1) are placed in parallel with the address electrodes to provide fluorescent layers on side walls of the ribs.

Front substrate 22 and rear substrate 23 are placed facing each other so that the display electrodes cross the address electrodes at approximately right angles, thereby forming tiny discharge spaces between the substrates, which are sealed along peripheries of the substrates.

A discharge space is filled with one of Heriun, Neon, Argon or Xenon, or a mixture thereof, as a discharge gas to produce a plasma display panel having a plurality of discharge cells where intersection points of the display electrodes and address electrodes are located.

On the other hand, a plurality of circuit blocks 26 to drive the panel for displaying are mounted on a back surface of chassis 14 and a panel holder made of aluminum or the like, and serving as a heat radiator, at the same time.

Panel 21 is bonded to a front surface of chassis 24, as a panel holder, with adhesive sheet 25 serving to conduct heat generated in panel 21 to chassis 24 for efficient radiation.

Next, a manufacturing method of the plasma display device disclosed in this invention is described with reference to FIGS. 5A–5D. In this invention, first, adhesive sheet 25 is bonded to the front surface of chassis 24 such that adhesive layer 25c side of adhesive sheet 25 faces chassis 24, to bond panel 21 to chassis 24, or a holder, via adhesive sheet 25.

Figure 5A:
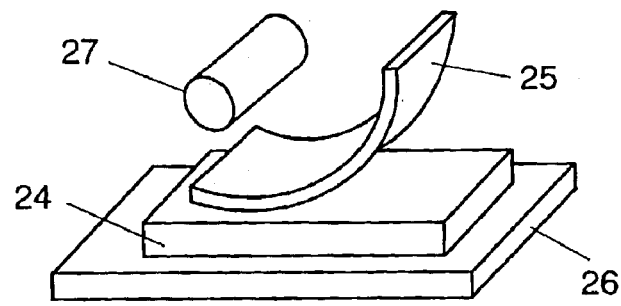
FIGS. 5A–5D illustrate a partial schematic view showing a manufacturing process of a plasma display device used in an exemplary embodiment of the present invention.

FIG. 5A shows a method to bond adhesive sheet 25 to chassis 24. Adhesive layer 25c of adhesive sheet 25 bonds to the front surface of chassis 24, while placed on table 26, by applying pressure gradually from one side of chassis 24 using pressure roller 27.

Figure 5B:
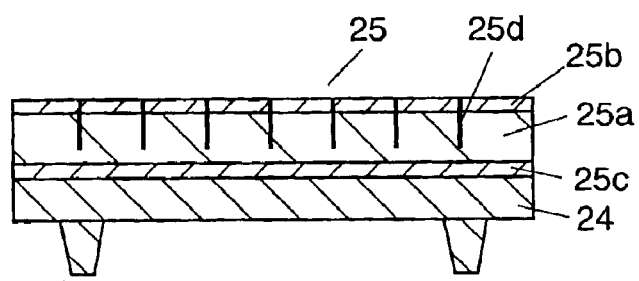

This method can bond adhesive sheet 25 to chassis 24 tightly without any residual air bubble between sheet 25 and chassis 24 as shown in FIG. 5B. Additionally, adhesive sheet 25 carries peel-off sheets on adhesive layers 25b and 25c, like typical double face tape, though not shown in drawings. Pressure should be applied using pressure roller 27 from on top of a corresponding one of the peel-off sheets.

Figure 5C:
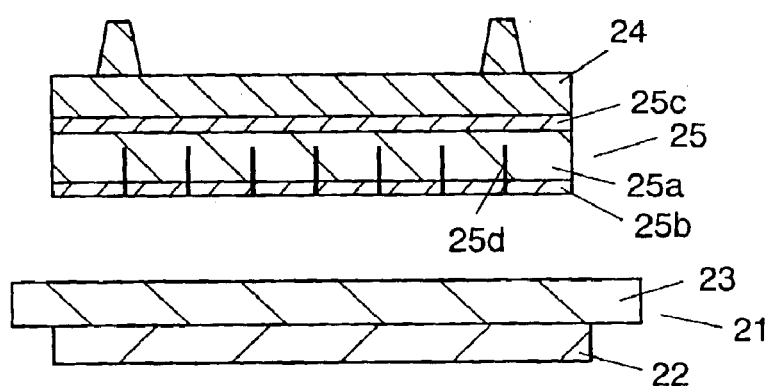
Figure 5D:
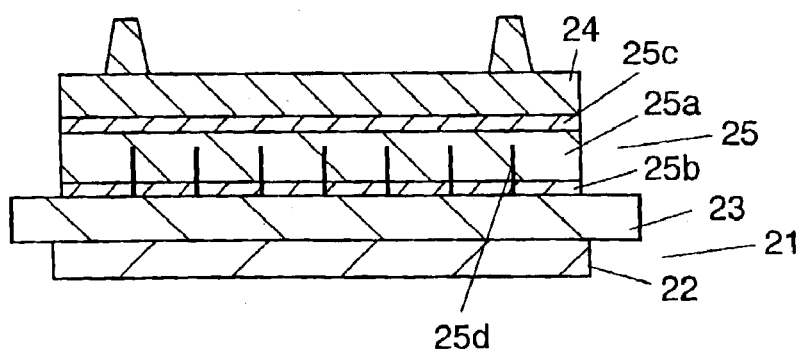

Next, as shown in FIG. 5C, chassis 24 carrying adhesive sheet 25 is placed on panel 21 for positioning such that adhesive sheet 25 faces panel 21 to bond to panel 21 via adhesive sheet 25 provisionally. Then, in this state, pressure is applied to chassis 24 gradually to a prescribed value, and this prescribed pressure is allowed to be applied for a given length of time, and then released, to finish adhesion of panel 21 and chassis 24 via adhesive sheet 25. FIG 5D illustrates a view after this adhesion.

A second surface of adhesive sheet 25 carried on chassis 24 can surely be bonded to panel 21 without any residual air bubble between adhesive sheet 25 and panel 21 by using pressure roller 27, or the like, to push out air bubbles, as panel 21 is made from a rigid material.

The configuration disclosed in this invention employs adhesive sheet 25, consisting of a porous insulating sheet 25a provided with adhesive layers 25b and 25c on both sides. And, adhesive layer 25b that faces panel 21 is provided with slits 25d as shown in FIG. 4.

Residual air left between panel 21 and adhesive sheet 25 diffuses into porous insulating sheet 25a through slits 25d and then radiates to an exterior, when panel 21 and adhesive sheet 25 are pressed after the provisional adhesion. Panel 21, therefore, can be bonded to adhesive sheet 25 tightly, thereby creating sufficient contact area.

FIG. 6 illustrates a schematic cross-sectional view showing a configuration of a plasma display device used in another exemplary embodiment of the present invention.

As shown in FIG. 6, adhesive sheet 25 also provides adhesive layer 25c side with slits 25e. This configuration enables adhesive sheet 25 and chassis 24 also to be bonded with sufficient contact area without any residual air bubble between adhesive sheet 25 and chassis 24. In such a case as to provide slits 25d and 25e on both sides of adhesive sheet 25, positions of slits 25d and 25e are preferably shifted relative to each other. Needless to say, bore holes instead of slits can provide similar affects.

Next, a dismantling method of a plasma display device manufactured according to the aforementioned method is described to separate the plasma display device into the panel, mainly composed of glass material, and the chassis, serving as a holder and mainly composed of metallic material, in case of scrapping due to failure.

Figure 7:
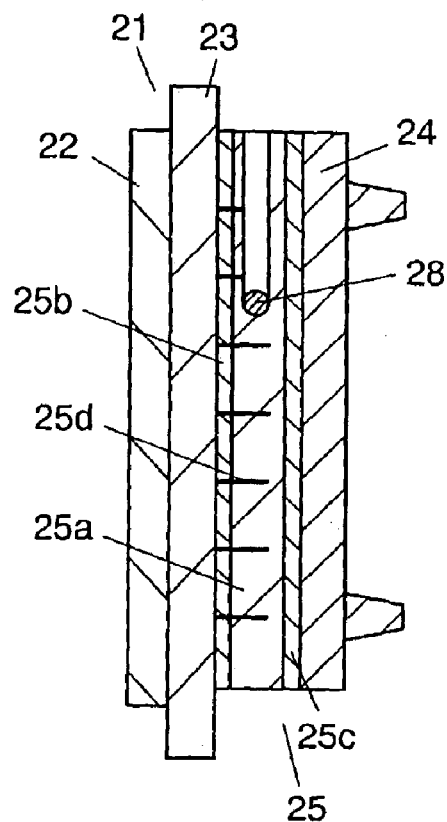
FIG. 7 illustrates a schematic cross-sectional view showing a dismantling method of a plasma display device used in an exemplary embodiment of the present invention.
Figure 8:
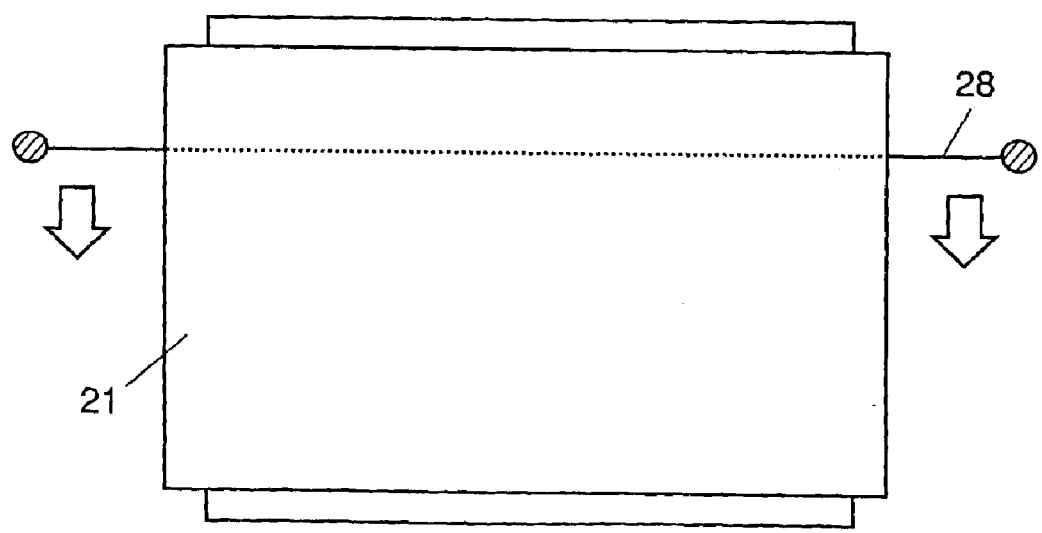
FIG. 8 illustrates a plan view of FIG. 7.

FIG. 7 illustrates a schematic cross-sectional view showing a dismantling method of a plasma display device used in an exemplary embodiment of the present invention. And, FIG. 8 illustrates a plan view of FIG. 7. As shown in FIGS. 7 and 8, a plasma display device disclosed in this invention comprises: (a) panel 21 having a plurality of discharge micro cells; (b) metal chassis 24 to hold panel 21; and (c) adhesive sheet 25 to bond a rear surface of panel 21 and a front surface of chassis 24, wherein adhesive sheet 25 consists of heat conductive porous insulating sheet 25a having adhesive layers 25b and 25c provided on both surfaces of insulating sheet 25a. Panel 21 can be easily separated from chassis 24 for dismantling by cutting a portion of porous insulating sheet 25a using, for example, metal cutting wire 28 or the like.

Cutting wire 28, to serve as a cutting tool, has a length longer than that of a long side or short side of panel 21. Cutting wire 28, tugged to show no sagging, can cut the insulating sheet 25a when moved to cut a portion of insulating sheet 25a from one side of panel 21 as shown in FIGS. 7 and 8. A tape shaped metal cutting tool can replace cutting wire 28 used in FIGS. 7 and 8. Additionally, sliding back and forth a wire like jig saw having saw teeth or a metal tape, inserted between panel 21 and chassis 24, or a rotary cutting tool like a rotary saw may perform the cutting.

As mentioned above, the invention disclosed employs adhesive sheet 25 consisting of heat conductive porous insulating sheet 25a provided with adhesive layers 25b and 25c on both sides of the insulating sheet to bond panel 21 and chassis 24 to one another. As the porous insulating sheet 25 contains great many tiny cavities, the sheet can be cut easily by a cutting tool such as a cutting wire or the like inserted into the sheet.

Consequently, panel 21 can be separated from chassis 24 easily within a shorter time than that associated with conventional arts.

FIGS. 9A–11 illustrate a schematic perspective view showing a dismantling method of a plasma display device used in other exemplary embodiments of the present invention.

Figure 9A:
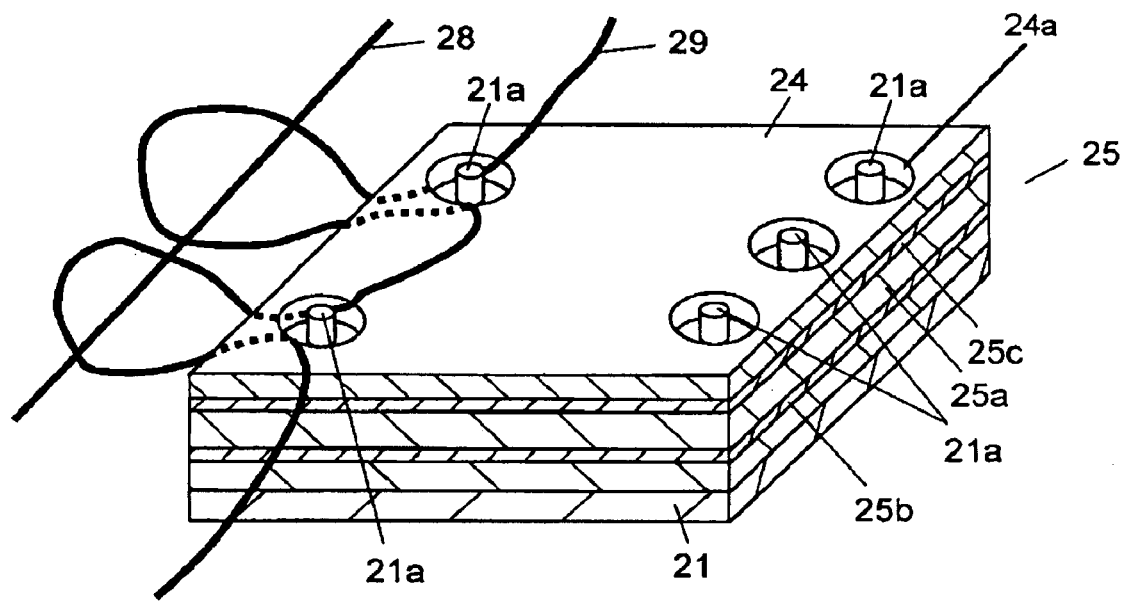
FIGS. 9A and 9B illustrate perspective views showing a dismantling method of a plasma display device used in another exemplary embodiment of the present invention.
Figure 9B:
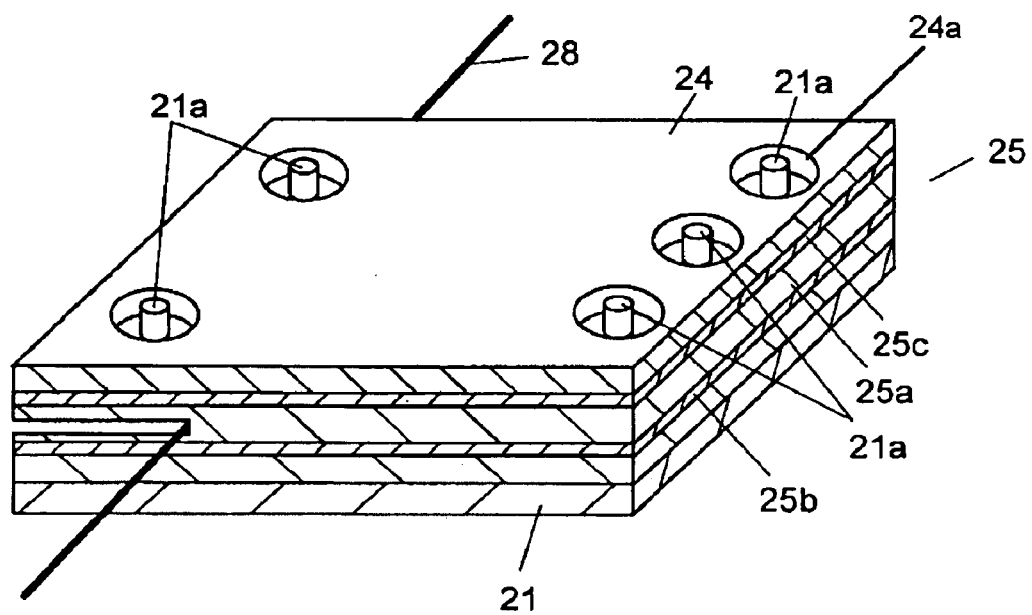

FIGS. 9A and 9B, and FIGS. 10A and 10B illustrate exemplary cases showing cutting wire 28 inserted between panel 21 and chassis 24. FIGS. 9A and 9B show an example in which cutting wire 28 is inserted between panel 21 and chassis 24 using guiding wire 29. Generally, panel 21 has a plurality of tip-off tubes 21a to exhaust an inner discharge space, to fill discharge gases or to dose getter materials. And, chassis 24 has through holes 24a such that through holes 24a do not touch corresponding tip-off tubes 21a of panel 21.

In examples shown in FIGS. 9A and 9B, a pulled out portion of guiding wire 29 runs through between panel 21 and chassis 24, and pulled out of edge using through holes 24a, is used to insert cutting wire 28 between panel 21 and chassis 24. Cutting wire 28 is guided such that the cutting wire 28 does not touch tip-off tubes 21a, and can cut porous insulating sheet 25a of adhesive sheet 25 smoothly.

Figure 10A:
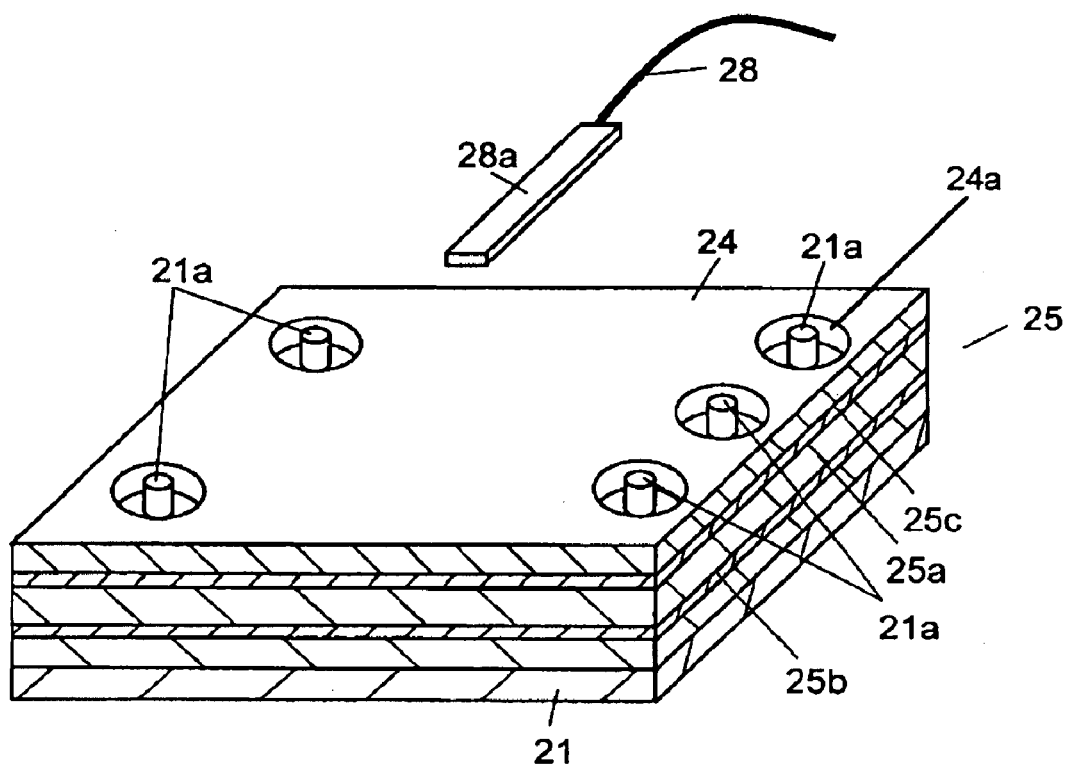
FIGS. 10A and 10B illustrate perspective views showing a dismantling method of a plasma display device used in another exemplary embodiment of the present invention.
Figure 10B:
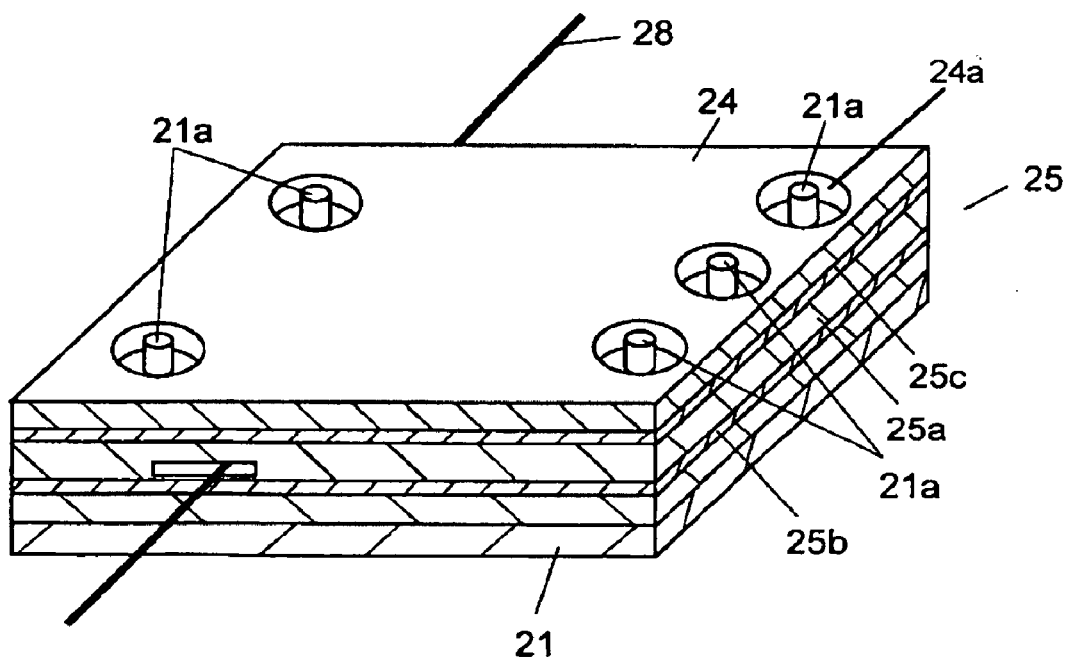

FIGS. 10A and 10B illuminate an example in which a tape shaped metal plate 28a is coupled to an end of cutting wire 28 to insert the cutting wire between panel 21 and chassis 24 more easily. Inserted metal plate 28a can guide cutting wire 28 to enter between panel 21 and chassis 24.

Figure 11:
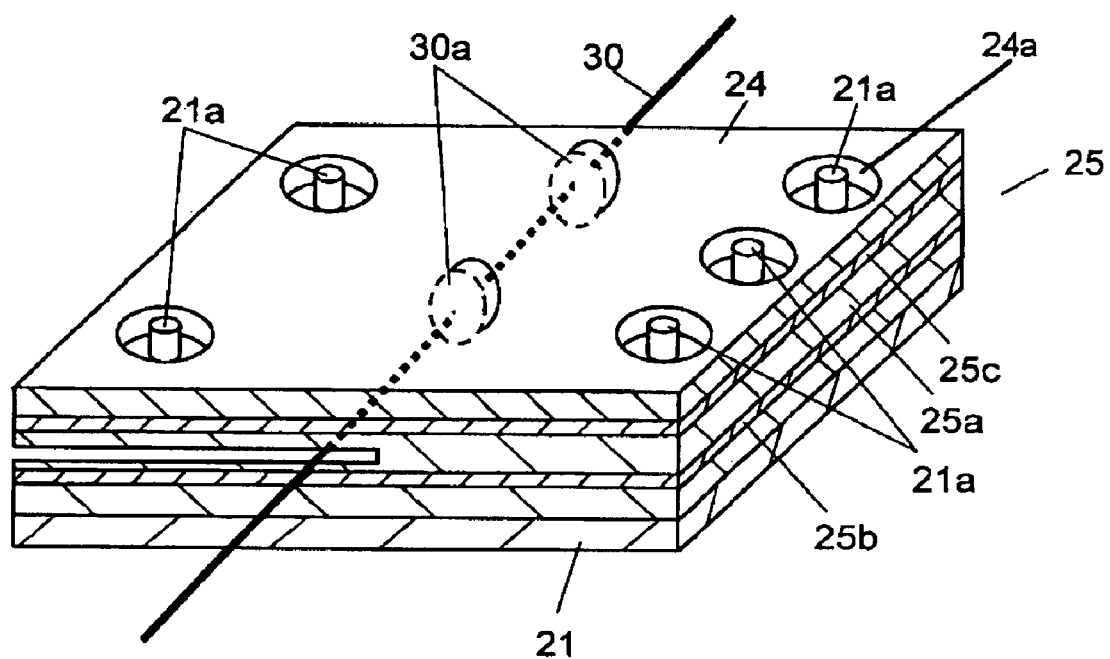
FIG. 11 illustrates a perspective view showing a dismantling method of a plasma display device used in another exemplary embodiment of the present invention.

FIG. 11 illustrates another example in which porous insulating sheet 25a of heat conductive sheet 25 between panel 21 and chassis 24 is cut using another cutting wire 30 equipped with rollers 30a.

Cutting wire 30 can maintain an approximately central positioning in a thickness direction of insulating sheet 25a without meandering, as rollers 30a roll while contacting inner surfaces of panel 21 and chassis 24 when cutting wire 30 moves inside of porous insulating sheet 25a of adhesive sheet 25. Moreover, as friction resistance due to contact of the cutting wire with adhesive layer 25b or 25c in case of another cutting wire is reduced, cutting wire 30 can cut porous insulating sheet 25a of heat conductive sheet 25 smoothly.

As is clear from the above, according to the manufacturing method disclosed in the invention, the plasma display device has such a configuration that the panel and holder are bonded together via an adhesive sheet to provide sufficient contact area. Moreover, the panel and holder can be dismantled easily to contribute to efficient recycling of materials for plasma display devices.

What is claimed is:

1. A method for manufacturing a plasma display device, comprising:
bonding a panel holder to a first adhesive layer on one surface of a heat conductive porous insulating sheet; and
bonding a rear side of a panel to a second adhesive layer on another surface of said heat conductive porous insulating sheet so as to bond said panel to said panel holder, with openings being provided in a surface of said second adhesive layer that faces said rear side of said panel;
wherein said panel includes two substrates facing each other such that a discharge space is formed between said two substrates to provide a plurality of discharge cells, with at least a front side of said two substrates being transparent.

2. The method according to claim 1, wherein
said openings comprise slits extending in a thickness direction of said heat conductive porous insulating sheet.

3. The method according to claim 2, wherein
slits are provided in said another surface of said heat conductive porous insulating sheet, with said slits in said another surface of said heat conductive porous insulating sheet being in communication with said slits in said surface of said second adhesive layer.

4. The method according to claim 3, wherein
slits are provided in a surface of said first adhesive layer that faces said panel holder.

5. The method according to claim 4, wherein
slits are provided in said one surface of said heat conductive porous insulating sheet, with said slits in said one surface of said heat conductive porous insulating sheet being in communication with said slits in said surface of said first adhesive layer.

6. The method according to claim 5, wherein
said slits in said surface of said first adhesive layer and said slits in said one surface of said heat conductive porous insulating sheet are staggered with respect to said slits in said surface of said second adhesive layer and said slits in said another surface of said heat conductive porous insulating sheet.

7. The method according to claim 1, wherein
openings are provided in a surface of said first adhesive layer that faces said panel holder.

8. The method according to claim 7, wherein
said openings in said surface of said first adhesive layer are staggered with respect to said openings in said surface of said second adhesive layer.

9. The method according to claim 8, wherein
openings are provided in said another surface of said heat conductive porous insulating sheet, with said openings in said another surface of said heat conductive porous insulating sheet being in communication with said openings in said surface of said second adhesive layer.

10. The method according to claim 9, wherein
openings are provided in said one surface of said heat conductive porous insulating sheet, with said openings in said one surface of said heat conductive porous insulating sheet being in communication with said openings in said surface of said first adhesive layer.

11. The method according to claim 10, wherein
said openings in said surface of said first adhesive layer, said openings in said one surface of said heat conductive porous insulating sheet, said openings in said surface of said second adhesive layer and said openings in said another surface of said heat conductive porous insulating sheet extend in a thickness direction of said heat conductive porous insulating sheet.

12. The method according to claim 11, wherein
said openings in said surface of said first adhesive layer and said openings in said one surface of said heat conductive porous insulating sheet are staggered with respect to said openings in said surface of said second adhesive layer and said openings in said another surface of said heat conductive porous insulating sheet.

13. The method according to claim 1, wherein
openings are provided in said another surface of said heat conductive porous insulating sheet, with said openings in said another surface of said heat conductive porous insulating sheet being in communication with said openings in said surface of said second adhesive layer.

14. A method of dismantling a plasma display device including a panel holder bonded to a panel via an adhesive sheet having a first adhesive layer on one surface of a heat conductive porous insulating sheet and a second adhesive layer on another surface of said heat conductive porous insulating sheet, with said panel holder being bonded to said first adhesive layer and a rear surface of said panel being bonded to said second adhesive layer, and with said panel including two substrates facing each other such that a discharge space is formed between said two substrates to provide a plurality of discharge cells, wherein at least a front side of said two substrates is transparent, said method comprising:
cutting said heat conductive porous insulating sheet so as to separate said panel from said panel holder.

15. The method according to claim 14, wherein
cutting said heat conductive porous insulating sheet comprises using a cutting tool, having a dimension greater than a length of a long side or a length of a short side of said panel, to cut said heat conductive porous insulating sheet.

16. The method according to claim 15, wherein
using a cutting tool to cut said heat conductive porous insulating sheet comprises using a wire to cut said heat conductive porous insulating sheet.

17. The method according to claim 16, wherein
using a wire to cut said heat conductive porous insulating sheet comprises using a metal wire to cut said heat conductive porous insulating sheet.

18. The method according to claim 16, wherein
using a wire to cut said heat conductive porous insulating sheet comprises using a guide wire to insert said wire between said panel and said panel holder.

19. The method according to claim 16, wherein
using a wire to cut said heat conductive porous insulating sheet comprises using a plate, coupled to an end of said wire, to insert said wire between said panel and said panel holder.

20. The method according to claim 16, wherein
using a wire to cut said heat conductive porous insulating sheet comprises using a wire, equipped with rollers, to cut said heat conductive porous insulating sheet.

* * * * *